Jan. 21, 1958 — D. L. HILEMAN — 2,820,655
TENACIOUS FASTENER
Filed Dec. 18, 1953
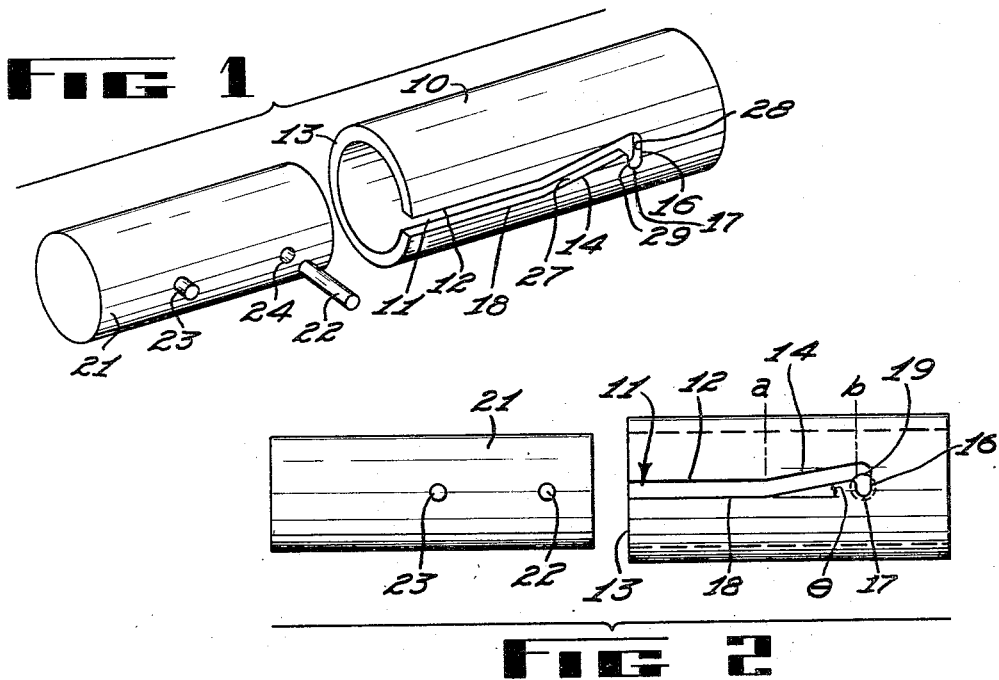
FIG 1
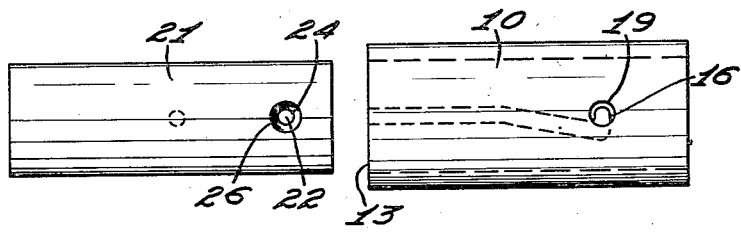
FIG 2
FIG 3
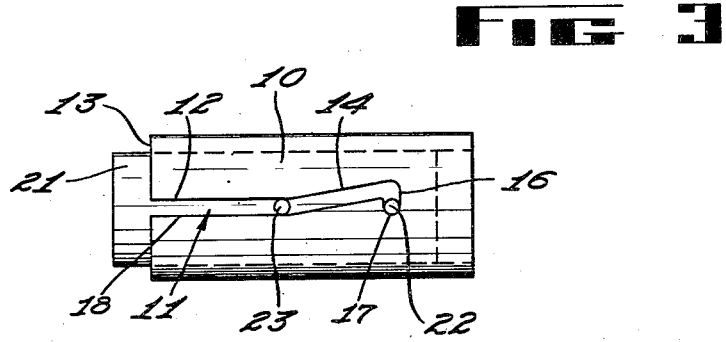
FIG 4
INVENTOR.
DALE L. HILEMAN
BY
ATTORNEY United States Patent Office 2,820,655
Patented Jan. 21, 1958

2,820,655

TENACIOUS FASTENER

Dale L. Hileman, Burbank, Calif., assignor to Collins Radio Company, Cedar Rapids, Iowa, a corporation of Iowa Application December 18, 1953, Serial No. 398,930

3 Claims. (Cl. 287—53)

This invention relates generally to fasteners and particularly to means for fastening a sleeve to a shaft.

It is an object of this invention to provide a fastening means which is easily engageable and which tenaciously couples a shaft and sleeve.

It is another object of this invention to provide a fastening means which maintains a shaft and sleeve in permanent axial alignment.

It is still another object of this invention to provide a fastening means which cannot be disengaged by vibration, yet may be disengaged when required without injury to component parts.

A feature of this invention is a sleeve which has a deformed slot that slideably engages a pair of pins on a shaft. One of the pins drops into a transverse portion of the slot and locks the sleeve and shaft together.

Further objects, advantages and features of this invention will be apparent to a person skilled in the art upon further study of this specification and drawings, in which:

Figure 1 illustrates a prospective view of the invention;

Figure 2 shows a top view of the invention;

Figure 3 is a bottom view of the invention; and

Figure 4 is a top view of the invention when engaged.

Referring specifically to the drawings, Figure 1 illustrates a sleeve 10 that has a deformed slot 11 which consists of a longitudinal portion 12, an inclined portion 14 and a transverse portion 16. Longitudinal portion 12 extends parallel to the axis of sleeve 10 from end 13 of sleeve 10 to dotted line "a" in Figure 2. Inclined portion 14 is formed between dotted lines "a" and "b" and slopes at a small angle θ with the axis of sleeve 10. Transverse portion 16 completes slot 11 and terminates at a bottom edge 17 which is aligned with the edge 18 of longitudinal portion 11.

A hole 19 is also formed in sleeve 10 and is diametrically opposite from transverse portion 16.

Figure 1 also illustrates a shaft 21 which has a first pin 22 radially projecting from a transverse hole 24 near the end of shaft 21. A second pin 23 also projects from shaft 21 and is aligned longitudinally with the first pin 22. A hole 26 is partially counterbored through shaft 21 in concentric alignment with a hole 24.

Sleeve 10 and shaft 21 are joined by sliding sleeve 10 over shaft 21, while slot 11 is aligned with pins 23 and 22, until pin 22 drops into transverse portion 16.

In more detail, pins 22 and 23 first enter longitudinal slot portion 12, and first pin 22 reaches inclined slot portion 14. As sleeve 10 is further moved over shaft 21, first pin 22 rides up the inclined edge 27 of portion 14. The force of the pins against the opposite sides of slot 11 tends to spread slot 11 and torsional tensions are built up within sleeve 10.

Pin 22 finally drops into transverse slot portion 16 and the tensions within sleeve 10 are released. A permanent connection is now provided between sleeve 10 and shaft 11 by the opposite walls 28 and 29 of transverse slot portion 16.

Sleeve 10 can be disengaged from shaft 11 when necessary by driving first pin 22 downwardly into counterbored hole 26 until the surface of shaft 21 is free of pin 22. Sleeve 10 and shaft 21 may now be uncoupled without resistance.

The angle of incline θ of inclined slot portion 14 is sufficiently small so that a relatively small force is required to push the sleeve and shaft into engagement.

This invention therefore provides an easily engageable coupling means for a sleeve and shaft. The coupling is vibration resistant and yet is easily disengaged. It prevents both longitudinal and rotational movement between a sleeve and shaft, and maintains them in alignment.

While a specific arrangement of parts has been shown to illustrate the invention, it is to be understood that changes and modifications may be made therein in the invention as defined in the appending claims.

I claim:

1. Fastening means between a shaft member received in a sleeve member comprising, said sleeve member formed at the joined end with a deformed slot that has longitudinal, inclined and transverse portions, said slot portions respectively arranged from the edge of the joined end of said sleeve, the shaft member having an outside diameter slightly smaller than the inside diameter of said sleeve, a first pin radially projecting from the surface of said shaft and received in the transverse portion of said slot, a second pin radially projecting from the surface of said shaft and longitudinally aligned with said first pin and spaced from said first pin by less than the length of the longitudinal portion of said deformed slot, and said second pin received in the longitudinal portion of the slot, whereby said shaft and sleeve members are coupled by longitudinally forcing the pins along the slot until said first pin drops into said transverse portion and are decoupled by disengaging the first pin from the transverse portion of the slot permitting sliding of said shaft member from within the sleeve.

2. A device for fastening a sleeve and a shaft wherein an end of the shaft is received in an end of the sleeve, and comprising, a pair of pins projecting from the surface of said shaft, said pins longitudinally aligned at the fastened end of said shaft, said sleeve having an internal diameter slightly larger than the outside diameter of said shaft, said sleeve formed at one end with a deformed slot that has longitudinal, inclined and transverse portions, the longitudinal slot portion extending from the edge of the joined end and receiving the second of the pins, the transverse slot portion arranged farthest from the edge of the joined end and receiving the first of the pins, the inclined slot portion formed at a slight angle to the longitudinal axis of the sleeve and connecting the longitudinal portion to the transverse portion, and said pins spaced apart by a distance less than the length of the longitudinal portion.

3. A device as in claim 2 in which said shaft is formed with a counterbored hole that frictionally supports the first pin, the counterbored hole located opposite the transverse slot portion when said sleeve and said shaft are engaged, the sleeve formed also with a hole aligned with the first pin when said sleeve and said shaft are engaged, and said hole having a diameter greater than the first pin whereby the sleeve and shaft may be coupled by sliding the first pin into the hole into said sleeve and whereby the sleeve and shaft may be decoupled by forcing the first pin into the counterbored hole, thus permitting sliding of the pins along the slot in said shaft.

References Cited in the file of this patent

UNITED STATES PATENTS

| 305,140 | Bradley | Sept. 16, 1884 |
| 1,014,108 | Wild | Jan. 9, 1912 |
| 2,192,644 | La May et al. | Mar. 5, 1940 |

FOREIGN PATENTS

| 582,150 | France | Oct. 9, 1924 |